US012795622B2

(12) United States Patent
Go et al.

(10) Patent No.: US 12,795,622 B2
(45) Date of Patent: Nov. 10, 2026

(54) METHOD AND DEVICE FOR TRANSMITTING AND RECEIVING SOUNDING REFERENCE SIGNAL IN WIRELESS COMMUNICATION SYSTEM

(71) Applicant: LG Electronics Inc., Seoul (KR)

(72) Inventors: Seongwon Go, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 181 days.

(21) Appl. No.: 18/695,173

(22) PCT Filed: Sep. 29, 2022

(86) PCT No.: PCT/KR2022/014621
§ 371 (c)(1),
(2) Date: Mar. 25, 2024

(87) PCT Pub. No.: WO2023/055106
PCT Pub. Date: Apr. 6, 2023

(65) Prior Publication Data
US 2024/0397490 A1 Nov. 28, 2024

(30) Foreign Application Priority Data
Sep. 29, 2021 (KR) ........................ 10-2021-0129073

(51) Int. Cl.
*H04W 72/0446* (2023.01)
*H04W 72/232* (2023.01)

(52) U.S. Cl.
CPC ..... *H04W 72/0446* (2013.01); *H04W 72/232* (2023.01)

(58) Field of Classification Search
CPC ........... H04W 72/0446; H04W 72/232; H04W 72/21; H04L 5/0048; H04L 5/0051; H04L 5/0053; H04L 5/0094; H04L 5/00
See application file for complete search history.

(56) References Cited

U.S. PATENT DOCUMENTS 11,533,202 B2 * 12/2022 Chen ................ H04W 72/0446
2013/0242895 A1 9/2013 Chen et al.
(Continued)

FOREIGN PATENT DOCUMENTS

KR 10-2021-0025045 3/2021
WO WO 2011/162519 12/2011
(Continued)

OTHER PUBLICATIONS

Office Action in Japanese Appln. No. 2024-519020, mailed on Jan. 14, 2025, 5 pages (with English translation).
(Continued)

*Primary Examiner* — Afshawn M Towfighi
(74) *Attorney, Agent, or Firm* — Fish & Richardson P.C.

(57) ABSTRACT

Disclosed is a method and device for transmitting and receiving an SRS in a wireless communication system. A method for transmitting and receiving an SRS according to one embodiment of the present disclosure, comprises the steps of: receiving configuration information related to the SRS from a base station; receiving DCI from the base station; and transmitting the SRS on the basis of the DCI, wherein the configuration information includes information for configuring at least one available slot offset for each of at least one SRS resource set, and the number of the at least one available slot offset configured for each of the at least one SRS resource set may be the same.

8 Claims, 8 Drawing Sheets

(56) References Cited

U.S. PATENT DOCUMENTS

| | | | | |
|---|---|---|---|---|
| 2019/0190669 | A1* | 6/2019 | Park | H04W 72/21 |
| 2021/0212101 | A1* | 7/2021 | Jiang | H04W 72/535 |
| 2022/0232535 | A1* | 7/2022 | Abdelghaffar | H04L 5/0091 |
| 2024/0063976 | A1* | 2/2024 | Wang | H04L 5/0051 |

FOREIGN PATENT DOCUMENTS

| | | |
|---|---|---|
| WO | WO 2013/024987 | 2/2013 |
| WO | WO 2019/098717 | 5/2019 |

OTHER PUBLICATIONS

Xiaomi, "Discussion on SRS enhancements," R1-2107898, 3GPP TSG-RAN WG1 Meeting #106-e, e-Meeting, Aug. 16-27, 2021, 14 pages.

International Search Report and Written Opinion in Appln. No. PCT/KR2022/014621, mailed on Jan. 12, 2023, 6 pages (with English translation).

* cited by examiner

METHOD AND DEVICE FOR TRANSMITTING AND RECEIVING SOUNDING REFERENCE SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2022/014621, filed on Sep. 29, 2022, which claims the benefit of Korean Application No. 10-2021-0129073, filed on Sep. 29, 2021. The disclosures of the prior applications are incorporated by reference in their entirety.

TECHNICAL FIELD

The present disclosure relates to a wireless communication system, and more specifically, to a method and device for transmitting and receiving a sounding reference signal (SRS) in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

The technical problem of the present disclosure is to provide a method and device for transmitting and receiving a sounding reference signal.

In addition, an additional technical problem of the present disclosure is to provide a method and device for transmitting and receiving an aperiodic sounding reference signal based on the SRS request field and/or slot offset indicator field included in downlink control information.

The technical objects to be achieved by the present disclosure are not limited to the above-described technical objects, and other technical objects which are not described herein will be clearly understood by those skilled in the pertinent art from the following description.

As an embodiment of the present disclosure, a method of transmitting a sounding reference signal (SRS) by a user equipment (UE) in a wireless communication system may include receiving, from a base station, configuration information related to SRS; receiving, from the base station, downlink control information (DCI); and transmitting the SRS based on the DCI, and the configuration information may include information for configuring at least one available slot offset for each of at least one SRS resource set, and a number of the at least one available slot offset configured for each of the at least one SRS resource set may be same.

As an embodiment of the present disclosure, a method of receiving a sounding reference signal (SRS) by a base station in a wireless communication system may include transmitting, to a user equipment (UE), configuration information related to SRS; transmitting, to the UE, downlink control information (DCI); and receiving the SRS based on the DCI, and the configuration information may include information for configuring at least one available slot offset for each of at least one SRS resource set, and a number of the at least one available slot offset configured for each of the at least one SRS resource set may be same.

According to an embodiment of the present disclosure, a method and device for transmitting and receiving a sounding reference signal may be provided.

In addition, according to an embodiment of the present disclosure, a method and device for transmitting and receiving an aperiodic sounding reference signal based on the SRS request field and/or slot offset indicator field included in DCI may be provided.

In addition, according to an embodiment of the present disclosure, as the same number of slot offset values are set for a plurality of SRS resource sets connected to the code point included in the SRS request field, ambiguity related to the slot offset indicator can be resolved.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
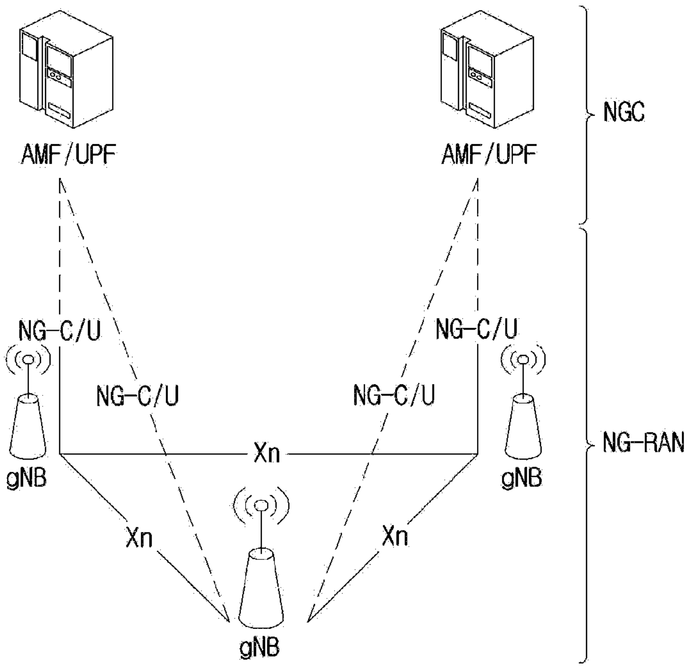
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
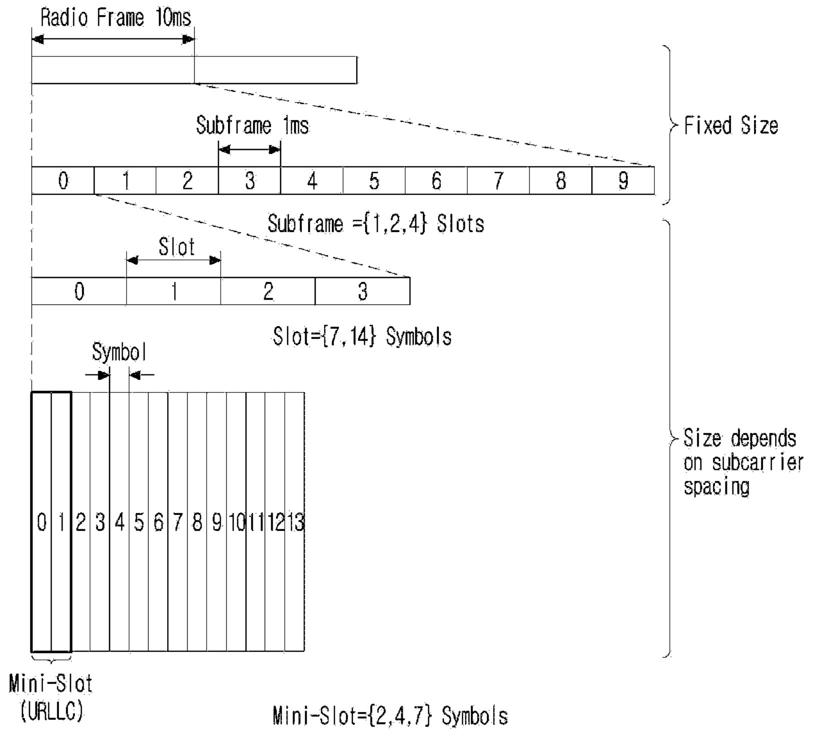
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^\mu \cdot 15$ [KHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot 10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration u, slots are numbered in an increasing order of $n_s^\mu\in\{0, \ldots, N_{slot}^{subframe,\mu}-1\}$ in a subframe and are numbered in an increasing order of $n_{s,f}^\mu\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
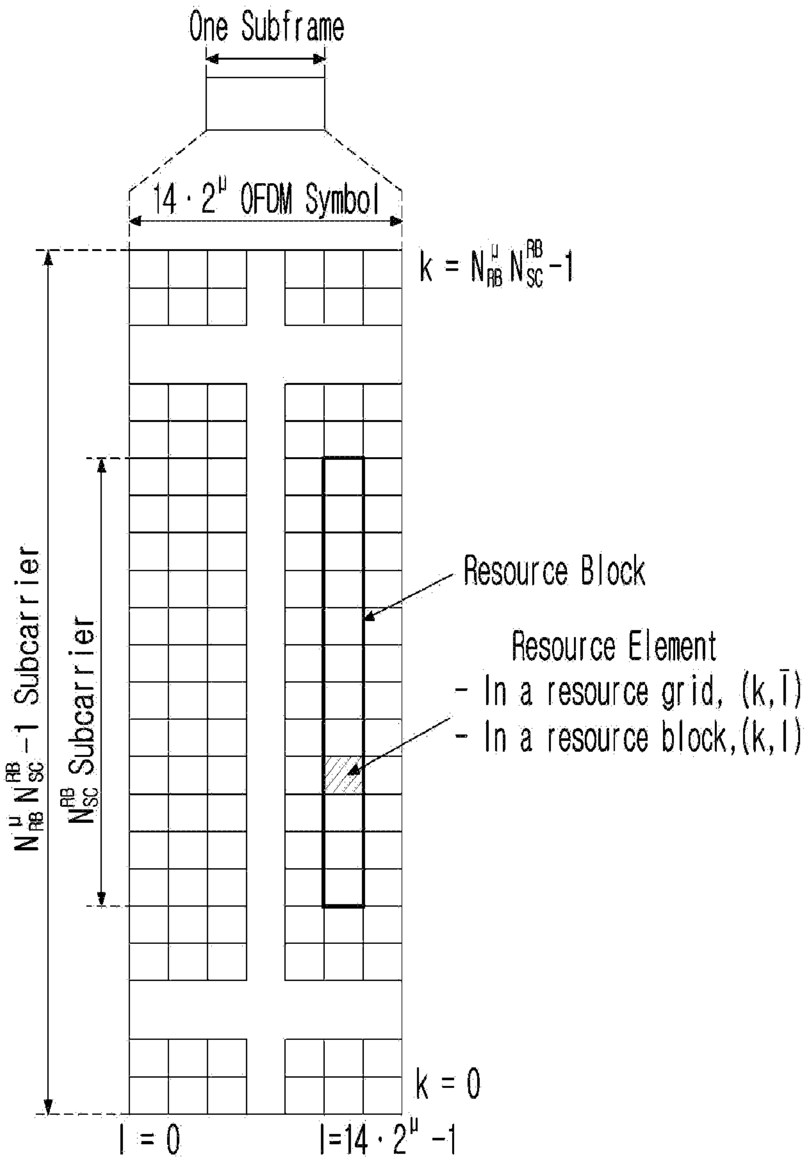
FIG. 3 illustrates a resource grid in a wireless communication system to which the present disclosure may be applied.

FIG. 3 illustrates a resource grid in a wireless communication system to which the present disclosure may be applied. In reference to FIG. 3, it is illustratively described that a resource grid is configured with $N_{RB}^\mu N_{sc}^{RB}$ subcarriers in a frequency domain and one subframe is configured with $14\cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu\le N_{RB}^{max,\mu}$. The $N_{RB}^{max,\mu}$ represents a maximum transmission bandwidth, which may be different between an uplink and a downlink as well as between numerologies.

In this case, one resource grid may be configured per $\mu$ and antenna port p. Each element of a resource grid for $\mu$ and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for u and an antenna port p corresponds to a complex value, $a_{k,l'}^{(p,\mu)}$. When there is no risk of confusion or when a specific antenna port or numerology is not specified, indexes p and $\mu$ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number). Common resource blocks are numbered from 0 to the top in a frequency domain for a subcarrier spacing configuration $\mu$. The center of subcarrier 0 of common resource block 0 for a subcarrier spacing configuration $\mu$ is identical to 'point A'. A relationship between a common resource block number $n_{CRB}^\mu$ and a resource element (k,l) for a subcarrier spacing configuration $\mu$ in a frequency domain is given as in the following Equation 1.

$$n_{CRB}^{\mu}=\left\lfloor\frac{k}{N_{sc}^{RB}}\right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n^{\mu}_{CRB} = n^{\mu}_{PRB} + N^{start,\mu}_{BWP,i} \quad \text{[Equation 2]}$$

$N_{BWP,i}^{start,\mu}$ is a common resource block that a BWP starts relatively to common resource block 0.

Figure 4:
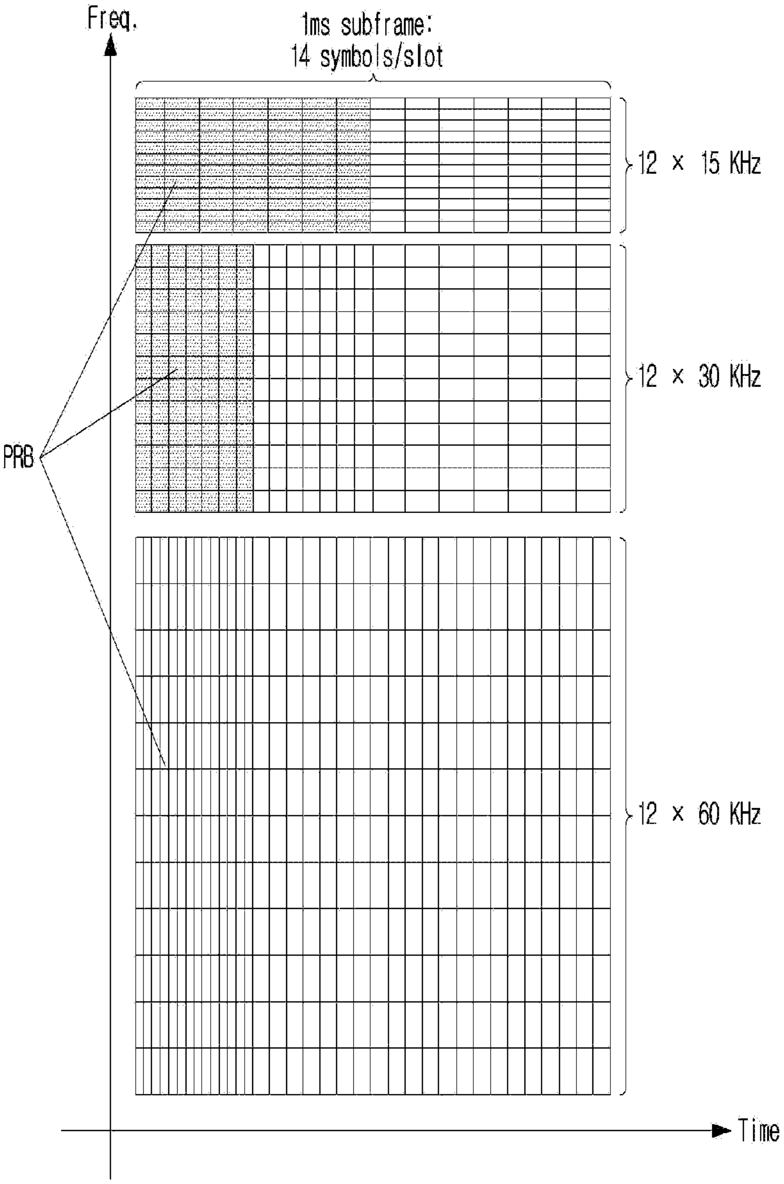
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
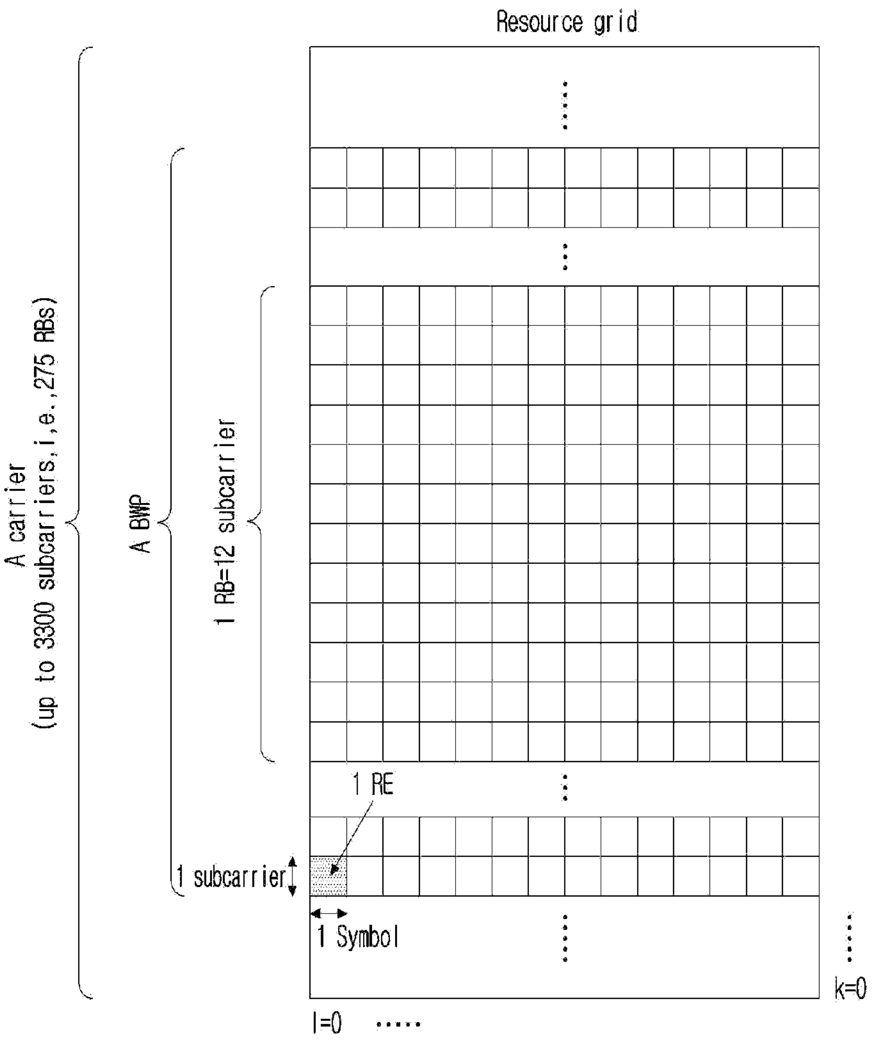
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP.

Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC.

A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP.

But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
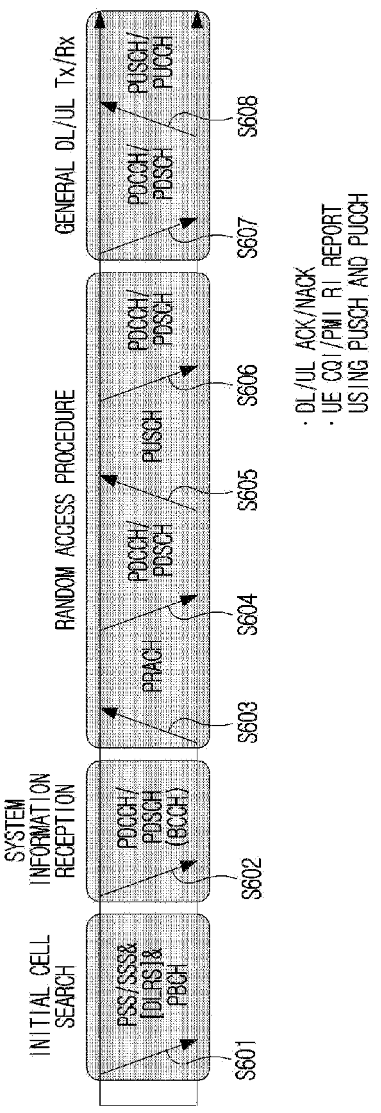
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Sounding Reference Signal (SRS)

In Rel-15 NR, spatialRelationInfo may be used to indicate a transmission beam which will be used when a base station transmits an UL channel to a terminal. A base station may indicate which UL transmission beam will be used when transmitting a PUCCH and a SRS by configuring a DL reference signal (e.g., a SSB-RI (SB Resource Indicator), a CRI (CSI-RS Resource Indicator) (P/SP/AP: periodic/semi-persistent/aperiodic)) or a SRS (i.e., a SRS resource) as a reference RS for a target UL channel and/or a target RS through a RRC configuration. In addition, when a base station schedules a PUSCH to a terminal, a transmission beam which is indicated by a base station and used for SRS transmission is indicated as a transmission beam for a PUSCH through a SRI field and used as a PUSCH transmission team of a terminal.

Hereinafter, a SRS for a codebook (CB) and a non-codebook (NCB) is described.

First, for a CB UL, a base station may first configure and/or indicate transmission of a SRS resource set for 'a CB' to a terminal. In addition, a terminal may transmit any n port SRS resource in a corresponding SRS resource set. A base station may receive a UL channel based on transmission of a corresponding SRS and use it for PUSCH scheduling of a terminal.

Subsequently, a base station may indicate a PUSCH (transmission) beam of a terminal by indicating a SRS resource for 'a CB' which is previously transmitted by a terminal through a SRI field of DCI when performing PUSCH scheduling through UL DCI. In addition, a base station may indicate an UL rank and an UL precoder by indicating an uplink codebook through a TPMI (transmitted precoder matrix indicator) field. Thereby, a terminal may perform PUSCH transmission according to a corresponding indication.

Next, for a NCB UL, a base station may first configure and/or indicate transmission of a SRS resource set for 'a non-CB' to a terminal. In addition, a terminal may simultaneously transmit corresponding SRS resources by determining a precoder of SRS resources (up to 4 resources, 1 port per resource) in a corresponding SRS resource set based on reception of a NZP CSI-RS connected with a corresponding SRS resource set.

Subsequently, a base station may indicate a PUSCH (transmission) beam of a terminal and an UL rank and an UL precoder at the same time by indicating part of SRS resources for 'a non-CB' which is previously transmitted by a terminal through a SRI field of DCI when performing PUSCH scheduling through UL DCI. Thereby, a terminal may perform PUSCH transmission according to a corresponding indication.

Hereinafter, a SRS for beam management is described.

A SRS may be used for beam management. Specifically, UL BM may be performed by beamformed UL SRS transmission. Whether UL BM of a SRS resource set is applied (a higher layer parameter) is configured by 'usage'. When usage is configured as 'BeamManagement (BM)', only one SRS resource may be transmitted to each of a plurality of SRS resource sets in a given time instant.

A terminal may be configured with at least one Sounding Reference Symbol (SRS) resource set configured by (a higher layer parameter) 'SRS-ResourceSet' (through higher layer signaling, e.g., RRC signaling, etc.). For each SRS resource set, UE may be configured with K≥1 SRS resources (a higher layer parameter, 'SRS-resources'). In this case, K is a natural number and the maximum value of K is indicated by SRS_capability.

Hereinafter, a SRS for antenna switching is described.

A SRS may be used to acquire DL CSI (Channel State Information) information (e.g., DL CSI acquisition). As a specific example, a BS (Base station) may measure a SRS from UE after scheduling transmission of a SRS to UE (User Equipment) in a single cell or in multi cells (e.g., carrier aggregation (CA)) based on TDD.

Here, a base station may perform scheduling of a DL signal/channel to UE based on measurement by a SRS by assuming DL/UL reciprocity. Here, regarding SRS based DL CSI acquisition, a SRS may be configured as usage of antenna switching.

In an example, when standards (e.g., 3gpp TS38.214) are followed, usage of a SRS may be configured to a base station and/or a terminal by using a higher layer parameter (e.g., usage of a RRC parameter, SRS-ResourceSet).

Here, usage of a SRS may be configured as usage of beam management, usage of codebook transmission, usage of non-codebook transmission, usage of antenna switching, etc.

Hereinafter, a case in which SRS transmission (i.e., transmission of an SRS resource or an SRS resource set) is configured for antenna switching among the usages will be specifically described.

In an example, for a terminal with partial reciprocity, SRS transmission based on antenna switching (i.e., transmission antenna switching) may be supported for DL (downlink) CSI (Channel State Information) acquisition through SRS transmission under a situation such as TDD (Time Division Duplex).

When antenna switching is applied, about 15 us may be generally needed between SRS resources (and/or resources between an SRS resource and a PUSCH/PUCCH) for antenna switching of a terminal. By considering it, (the minimum) guard period as in the following Table 6 may be defined.

TABLE 6

| μ | Δf = 2μ · 15 [KHz] | Y [symbol] |
|---|---|---|
| 0 | 15 | 1 |
| 1 | 30 | 1 |
| 2 | 60 | 1 |
| 3 | 120 | 2 |

In Table 6, μ represents numerology, Δf represents subcarrier spacing and Y represents the number of symbols of a guard period, i.e., a length of a guard period. In reference to Table 6, the guard period may be configured based on a parameter μ which determines numerology. In the guard period, a terminal may be configured not to transmit any other signal and the guard period may be configured to be used fully for antenna switching. In an example, the guard period may be configured by considering SRS resources transmitted in the same slot.

In particular, when a terminal is configured and/or indicated to transmit an aperiodic SRS configured by intra-slot antenna switching, a corresponding terminal may transmit an SRS on each designated SRS resource by using a different transmission antenna and the above-described guard period may be configured between each resource.

In addition, as described above, when a terminal is configured with an SRS resource and/or an SRS resource set configured for antenna switching through higher layer signaling, a corresponding terminal may be configured to perform SRS transmission based on UE capability related to antenna switching. In this case, UE capability related to antenna switching may be '1T2R', '2T4R', '1T4R', '1T4R/2T4R', '1T1R', '2T2R', '4T4R', etc. Here, 'mTnR' may mean UE capability which supports m transmission and n reception.

(Example S1) For example, for a terminal which supports 1T2R, up to 2 SRS resource sets may be configured as a different value for resourceType of a higher layer parameter, SRS-ResourceSet. In this case, each SRS resource set may have 2 SRS resources transmitted in different symbols and each SRS resource may configure a single SRS port in a given SRS resource set. In addition, an SRS port for a second SRS resource in an SRS resource set may be configured to be associated with a UE antenna port different from an SRS port for a first SRS resource in the same SRS resource set.

(Example S2) In another example, for a terminal which supports 2T4R, up to 2 SRS resource sets may be configured as a different value for resourceType of a higher layer parameter, SRS-ResourceSet. Here, each SRS resource set may have 2 SRS resources transmitted in different symbols and each SRS resource may configure 2 SRS ports in a given SRS resource set. In addition, an SRS port pair for a second SRS resource in an SRS resource set may be configured to be associated with a UE antenna port different from an SRS port pair for a first SRS resource in the same SRS resource set.

(Example S3) In another example, for a terminal which supports 1T4R, SRS resource sets may be configured by a different scheme according to whether SRS transmission is configured as periodic, semi-persistent and/or aperiodic. First, when SRS transmission is configured as periodic or semi-persistent, 0 SRS resource set configured or 1 SRS resource set configured with 4 SRS resources based on resourceType of a higher layer parameter SRS-ResourceSet may be configured to be transmitted in different symbols.

Here, each SRS resource may configure a single SRS port in a given SRS resource set. In addition, an SRS port for each SRS resource may be configured to be associated with a different UE antenna port. On the other hand, when SRS transmission is configured as aperiodic, 0 SRS resource set configured or 2 SRS resource sets configured with a total of 4 SRS resources based on resourceType of a higher layer parameter SRS-ResourceSet may be configured to be transmitted in different symbols of 2 different slots. Here, an SRS port for each SRS resource in 2 given SRS resource sets may be configured to be associated with a different UE antenna port.

(Example S4) In another example, for a terminal which supports 1T1R, 2T2R, or 4T4R, up to 2 SRS resource sets respectively configured with one SRS resource sets may be configured for SRS transmission. The number of SRS ports of each SRS resource may be configured to be 1, 2, or 4.

When indicated UE capability is 1T4R/2T4R, a corresponding terminal may expect that the same number of SRS ports (e.g., 1 or 2) will be configured for all SRS resources in SRS resource set(s). In addition, when indicated UE capability is 1T2R, 2T4R, 1T4R, or 1T4R/2T4R, a corresponding terminal may not expect that one or more SRS resource sets configured for antenna switching in the same slot will be configured or triggered. In addition, when indicated UE capability is 1T1R, 2T2R, or 4T4R, a corresponding terminal may not expect that one or more SRS resource sets configured for antenna switching in the same slot will be configured or triggered.

Method of Transmitting a Sounding Reference Signal

In the basic wireless communication system, periodic/semi-persistent/aperiodic SRS is supported, and the SRS request field of DCI can be used for triggering of aperiodic SRS.

At this time, a slot offset (at a level for each set) for each SRS resource set indicated for transmission by the DCI may be configured by RRC signaling. Here, the slot offset means the offset value from the DCI reception slot to the SRS transmission slot. The UE may transmit aperiodic SRS based on the corresponding slot offset.

In an improved wireless communication system, the base station may indicate a specific slot offset among the slot offset values configured for each SRS resource set (by RRC signaling) through DCI.

Here, in a basic wireless communication system, the slot offset may be counted based on all slots. However, in an improved wireless communication system, the slot offset (i.e., 't' value) indicated by DCI (or, a slot offset indicator field consisting of up to n (e.g., n is 2)-bits included in DCI, etc.) may be counted based on the UL available slot. In addition, the 't' value, which is a slot offset that can be indicated by DCI, may be set to a maximum of 4 per SRS resource set, but is not limited to this.

Additionally or alternatively, the reference slot that is the reference for counting the slot offset t value may be based on the slot offset ('slotOffset') value configured by RRC signaling. The terminal may calculate the SRS transmission slot by applying the t value from the slot in which DCI was received to the slot after 'slotOffset' set by RRC signaling (i.e., calculate the SRS transmission slot by counting the 't' value based on the available slot).

Specifically, a given aperiodic SRS resource set may be transmitted in the (t+1)th available slot by counting from the reference slot.

Here, the 't' value, which is the slot offset value, is indicated from DCI or RRC signaling (e.g., when one 't' value is configured by RRC signaling), and the candidate value of 't' may include at least 0. The reference slot may include a slot with a triggering DCI or/and a slot indicated by a legacy triggering offset. The candidate value of 't' may be updated by MAC CE.

In addition, based on the RRC signaling, the available slot may include a slot in which a UL or flexible symbol(s) exists for the time domain location(s) for all SRS resources in the resource set and that satisfies the UE capability for the minimum timing requirement between all SRS resources in the resource set and the triggering of the PDCCH.

At the first symbol carrying the DCI including the SRS request field and the last symbol in the triggered SRS resource set, the UE may not expect to receive SFI indication, UL cancellation indication, or dynamic scheduling of DL channel/signal(s) in flexible symbol(s) that can change the determination of available slot. And, collision handling between the triggered SRS and other UL channels/signals may be performed after the available slot is determined.

The 't' value may be indicated through DCI format 0_1/0_2 without data and CSI requests and DCI that may schedule PDSCH/PUSCH. At this time, a field for indicating the 't' value exists in the DCI, and the field may be applied to a plurality of configured candidate values of 't'.

As described above, based on the specific SRS resource set indicated by the SRS request field of DCI, the interpretation of each codepoint of the DCI's slot offset indicator field (or 't' indication field) may vary.

For example, in the case of a 1T4R aperiodic SRS transmission situation, multiple SRS resource sets may be associated with one codepoint in the SRS request field.

Assume that the number of slot offset values configured for each of the plurality of SRS resource sets is different. At this time, the value indicated through the slot offset indicator field may be valid for a specific SRS resource set. As the number of slot offset values indicated by the Slot offset indicator field is insufficient, the value indicated by the field may not be valid for other SRS resource sets. Therefore, ambiguity may arise regarding how to interpret DCI's slot offset indicator field.

Hereinafter, the base station configuration/indication method for aperiodic SRS transmission of the terminal will be described.

In describing the present disclosure, 'transmission of an SRS resource set' may be used in the same sense as 'transmission of an SRS based on information configured in the SRS resource set'.

Additionally, 'transmission of SRS resource' or 'transmission of SRS resources' may be used in the same sense as 'transmission of SRS or SRSs based on information configured in the SRS resource'.

Additionally, SRS enhanced after Rel-17 may be referred to as additional SRS (additional SRS) or enhanced SRS (enhanced SRS). Additionally, a UE supporting the additional (enhanced) SRS may be referred to as an additional UE or an enhanced UE.

In this regard, legacy SRS refers to an SRS in which up to 4 symbols may be configured (legacy SRS configuration), and enhanced SRS (additional SRS) refers to an SRS in which more than 4 symbols may be configured (enhanced SRS (additional SRS) configuration). This is only for convenience of explanation and is not intended to limit the technical scope of the present disclosure.

Additionally, in this document, '/' means 'and' or 'or' or 'and/or' depending on the context.

Figure 7:
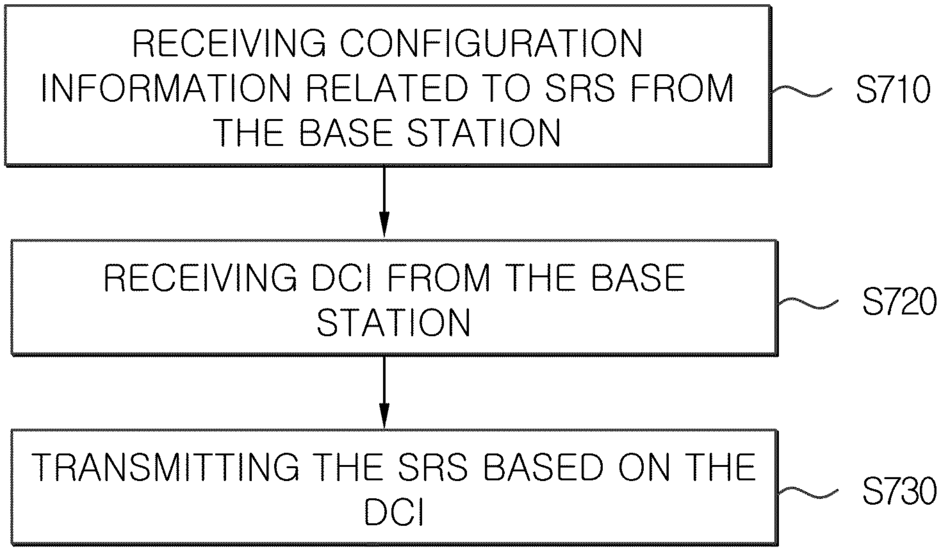
FIG. 7 is a diagram illustrating the operation of a terminal for transmitting and receiving a sounding reference signal according to an embodiment of the present disclosure.

FIG. 7 is a diagram illustrating the operation of a user equipment (UE) for transmitting and receiving a sounding reference signal according to an embodiment of the present disclosure.

The UE may receive configuration information related to SRS from the base station (S710). As an example, configuration information related to SRS (e.g., 'SRS-config') may include information related to SRS resource set/SRS resource.

For example, information related to the SRS resource set may include a resource type (e.g., aperiodic, etc.), ID, and usage of at least one SRS resource set, and/or information configuring at least one available slot offset for at least one SRS resource set.

As an example, the number of at least one available slot offset configured for each of at least one SRS resource set configured by configuration information may be the same. And, the number of available slot offsets that may be configured for each of at least one SRS resource set may be 1 to 4.

Additionally, information related to the SRS resource may include spatial relationship information for the SRS resource, the number of SRS ports, a PTRS port index associated with the SRS resource, and the type of the SRS resource.

The UE may receive downlink control information (DCI) from the base station (S720).

The DCI may include an SRS request field that triggers at least one specific SRS resource set among at least one SRS resource set configured by configuration information. Each codepoint in the SRS request field may be associated with one or more SRS resource sets. And, the same number of available slot offsets may be configured for the one or more SRS resource sets.

As an example, based on the number of at least one available slot offset set for each of at least one SRS resource set being greater than 1, DCI may include a slot offset indicator field indicating a specific available slot offset among at least one available slot offset.

As another example, based on the number of at least one available slot offset configured for each of at least one SRS resource set being 1, the DCI may not include a slot offset indicator field. That is, if the number of available slot offsets set for at least one SRS resource set configured by configuration information is all 1, the DCI may not include a separate slot offset indicator field.

The UE may transmit SRS based on DCI (S730). As an example, the UE may transmit (aperiodic) SRS to the base station based on the SRS request field and/or slot offset indicator field.

The UE may transmit (aperiodic) SRS to the base station based on at least one specific SRS resource set triggered by the SRS request field. At this time, the UE may transmit (aperiodic) SRS to the base station based on a specific available slot offset indicated by the DCI among at least one available slot offset configured for at least one specific SRS resource set.

Figure 8:
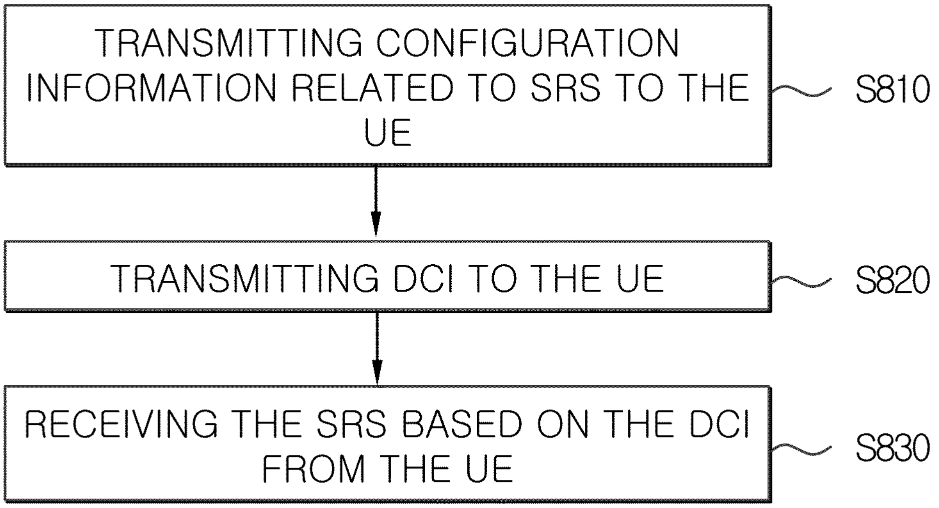
FIG. 8 is a diagram illustrating the operation of a base station for transmitting and receiving a sounding reference signal according to an embodiment of the present disclosure.

FIG. 8 is a diagram illustrating the operation of a base station for transmitting and receiving a sounding reference signal according to an embodiment of the present disclosure.

The base station may transmit configuration information related to SRS to the UE (S810).

Configuration information related to SRS may include information for configuring at least one available slot offset for each of at least one SRS resource set and information for aperiodically configuring the resource type of at least one SRS resource set. At this time, the number of available slot offsets configured for each of at least one SRS resource set may be the same.

The base station may transmit downlink control information (DCI) to the UE (S820).

At this time, DCI may be transmitted from the base station to the UE to trigger transmission of the aperiodic SRS resource set. DCI may include, but is not limited to, an SRS request field and/or a slot offset indicator field.

The base station may receive SRS based on DCI from the UE (S830). As an example, the base station may receive an SRS from the UE based on i) at least one specific SRS resource set triggered by an SRS request field and ii) a specific available slot offset indicated by a slot offset indicator field among at least one available slot offset configured for the specific one or more SRS resource sets.

Hereinafter, the base station configuration/indication method for aperiodic SRS transmission of the terminal will be described in detail.

Embodiment 1

Bit-width of the (explicit) t indication field included in the DCI may be determined based on the number of the largest t values among the number of t values set in each SRS resource set (i.e., based on the SRS resource set in which the most t values are configured).

Here, the SRS resource set may mean one or more SRS resource sets (i.e., one or more SRS resource sets belonging to an SRS trigger state) associated with the SRS request field of the DCI.

For example, assume a total of three SRS resource sets are connected to each codepoint in the SRS request field, as shown in Table 7 below.

TABLE 7

| Codepoint value | Connected SRS resource set and information on the SRS resource set |
|---|---|
| 00 | No trigger |
| 01 | SRS resource set #1 (two t values configured (t = 2, 4)) |
| 10 | SRS resource set #2 (one t value configured (t = 5)) |
| 11 | SRS resource set #3 (four t values configured (t = 2, 5, 7, 8)) |

When the SRS request field is configured as shown in Table 7, the SRS resource set with the most t values among the SRS resource sets set in the SRS trigger state is SRS resource set #3. Since the number of t values configured in the corresponding SRS resource set #3 is 4, the bit width or field size of the t indication field may be assumed/promised between the base station/UE to be 2 bits to indicate 4 t values. As an example, if the number of t values configured in SRS resource set #3 is 1, since the largest number (e.g., 2) of t values has been configured for SRS resource set #1, the t indication field may be assumed/promised between base stations/UEs with 1 bit.

As an example, the base station may update/activate the SRS resource set(s) connected to the SRS trigger state through a MAC CE message. At this time, the bit width of the t indication field may be determined according to a method described later.

Specifically, when the SRS trigger state is updated through MAC CE, the number of t values configured for each SRS resource set connected to the SRS trigger state may vary. Accordingly, the SRS resource set with the largest number of t values may vary. Additionally, there may be an ambiguous period in which the bit width of the t indication field varies depending on before and after the MAC CE update.

To solve this problem, the base station and the UE may promise/assume as a reference time that 3 ms has passed since the UE received the MAC CE message updating the SRS trigger state and transmitted its ACK/NACK.

In addition, the base station and the UE may promise/assume that the bit width of the t indication field is determined based on the t value set in each SRS resource set before the SRS trigger state update before the reference point. The base station and the UE may promise/assume that after the reference point, the bit width of the t indication field is determined based on the t value configured in each SRS resource set after the SRS trigger state update.

Additionally or alternatively, the UE may expect the same number of t values to be configured for all SRS resource sets configured/connected to the SRS trigger state. At this time, the bit width of the t indication field may be determined through the number of t values set identically for all SRS resource sets. For example, the bit width of the t indication field may be determined as ‘ceil (log 2(number of corresponding t values))’.

In the above-described example, it is assumed that the t indication field is explicitly implemented as a newly configurable DCI field, but it is not limited thereto. As an example, even when the t indication field is an implicit field or indicates a t value based on an unused field of DCI, the operation/assumption/promise/parameters of Example 1 described above may be applied/utilized.

Embodiment 2

The (explicit) t indication field of the DCI may be interpreted differently depending on which SRS resource set(s) the target SRS resource set(s) indicated through the SRS request field included in the DCI is.

In addition, the t values configured for each SRS resource set may be promised/assumed between the base station/UE in the form of mapping from the lowest code point of the t indication field to the lowest t value (i.e., mapping in ascending order).

For example, assume that the SRS request field is configured as shown in Table 7 above. Although the bit width of the t indication field is 2 bits (00, 01, 10, 11), the interpretation of the corresponding t indication field may vary depending on which SRS resource set the SRS resource set indicated through the SRS request field is among SRS resource sets #1, #2, and #3.

As an example, if SRS resource set #1 is indicated (by the SRS request field), each bit of the t indication field may be interpreted as '00: t=2', '01: t=4', '10: N/A', and '11: N/A'.

As another example, if SRS resource set #2 is indicated (by the SRS request field), each bit of the t indication field may be interpreted as '00: t=5', '01: N/A', '10: N/A', and '11: N/A'.

As another example, if SRS resource set #3 is indicated (by the SRS request field), each bit of the t indication field may be interpreted as '00: t=2', '01: t=5', '10: t=7', and '11: t=8'.

According to the above-described example, the number of codepoints in the available t indication field may vary based on the SRS resource set indicated in the SRS request field. At this time, the UE may not expect that an unavailable 'N/A' code point is indicated.

Embodiment 3

Embodiment 3 relates to configurations and operations related to the t value when multiple SRS resource sets are configured/connected to a specific codepoint (i.e., a specific trigger state) of the SRS request field of DCI.

In an improved wireless communication system, a plurality of SRS resource sets may be configured for a specific xTyR configuration for antenna switching aperiodic SRS triggering, similar to the 1T4R configuration. In addition, the plurality of SRS resource sets may all be connected to a specific code point in the SRS request field so that they may all be triggered with a single DCI instruction.

At this time, the code point indicated in the t indication field of the corresponding DCI is one value, but the number of SRS resource sets triggered by the SRS request field is 1 or more. Accordingly, it is necessary to interpret the t indication field for each SRS resource set based on the t value configured in each SRS resource set.

Embodiment 3-1

Assume that the bit width of the t indication field is determined in the manner according to Embodiment 1, and the t indication field is interpreted in the manner according to Embodiment 2. As an example, assume that the code point of the SRS request field is set as shown in Table 8 below.

TABLE 8

| Codepoint value | Connected SRS resource set and information about that set |
|---|---|
| 00 | No trigger |
| 01 | SRS resource set #1 (two t values configured (t = 2, 4)) |
| 10 | SRS resource set #2 (one t value configured (t = 5)) |
| 11 | SRS resource set #3 (two t values configured (t = 2, 5, 7, 8))SRS resource set #4 (four t values configured (t = 1, 3, 6, 9)) |

When the SRS request field is configured according to Table 8, the maximum number of t values configured in each SRS resource set is 4, so according to Embodiment 1, the bit width of the t indication field may be 2 bits. And, if the code point value indicated in the SRS request field is 00 or 01 (i.e., when SRS resource set #1 or #2 is indicated), since the interpretation of the t indication field was explained in Embodiment 2, redundant description will be omitted.

If the code point indicated in the SRS request field is 11, multiple SRS resource sets (i.e., SRS resource sets #3 and #4) may be triggered. Accordingly, for SRS resource set #3, the t indication field may be interpreted as '00: t=2', '01: t=5', '10: t=7', and '11: t=8'. In addition, for SRS resource set #4, the t indication field may be interpreted as '00: t=1', '01: t=3', '10: t=6', and '11: t=9'.

Additionally or alternatively, assume that two or more SRS resource sets are configured/connected/mapped to one SRS trigger state. At this time, the t value of the second (or, of the second-lowest index) SRS resource set configured in the trigger state is configured to the 't value+1' of the first (or lowest index) SRS resource set, or the UE may expect the corresponding configuration (option 1).

Alternatively, the UE may ignore the t value configured in the second (or, of the second lowest index) SRS resource set and assume/promise/recognize the configuration of 't value+1' in the first (or lowest index) SRS resource set (Option 2).

Here, the 't value+1' (or the '+1' part) may be counted as an available slot, or may be counted as all slots to increase performance through antenna switching SRS transmission in contiguous slots.

Options 1 and 2 above may be equally applied (e.g., first SRS resource set=t value, second SRS resource set=t value+1, third SRS resource set=t value+2, etc.) even when more than two SRS resource sets are configured/connected to one SRS trigger state. Additionally or alternatively, for Option 1 and Option 2, the terminal may expect the t value to be set only in the first (or lowest index) SRS resource set.

Additionally or alternatively, it is assumed that multiple SRS resource sets are configured/connected to a single SRS trigger state. Even if the number of t values set in each SRS resource set is different, when the t value is indicated from the base station through the t indication field of DCI, the UE may expect not to be indicated to make an ambiguous combination based on the t indication field.

As an example, the ambiguous combination includes a case where a specific code point of the t indication field indicates a t value only for a specific SRS resource set and does not indicate a t value for the remaining SRS resource sets.

Embodiment 3-2

When multiple SRS resource sets are associated with a (specific) code point in the SRS request field, the UE may expect the same number of t values to be configured in all SRS resource sets connected to the corresponding (specific) code point.

For example, assume that the field size of the t indication field is determined and a different number of t values is configured for each SRS resource set connected to the code point of one SRS request field. At this time, a specific codepoint in the t indication field may indicate a t value for a specific SRS resource set, but may not be valid for other SRS resource sets.

For example, assume that four t values are configured for SRS resource set #3, but two t values (t=1, 3) are configured for SRS resource set 4. Here, each bit of the t indication field for SRS resource set #4 may be interpreted as '00: t=1', '01: t=3', '10: N/A', and '11: N/A'. Accordingly, when '10' or '11' is indicated by the t indication field, the t indication field is invalid from the perspective of SRS resource set #4, and the UE operation may be ambiguous.

Additionally, when multiple SRS resource sets are triggered through the single codepoint, the UE may expect that the t value for each SRS resource set indicated through the t indication field will not overlap.

Additionally or alternatively, it is assumed that multiple SRS resource sets are configured/connected to a single SRS trigger state. Even if the number of t values set in each SRS resource set is different, when the t value is indicated from the base station through the t indication field of DCI, the UE may expect not to be indicated to make an ambiguous combination based on the t indication field.

As an example, the ambiguous combination includes a case where a specific code point of the t indication field indicates a t value only for a specific SRS resource set and does not indicate a t value for the remaining SRS resource sets.

Embodiment 3-3

Contrary to Embodiment 3-2, when multiple SRS resource sets are associated with a (specific) code point of the SRS request field, a different number of t values may be configured for each SRS resource set connected to the code point.

At this time, if a specific code point is indicated by the base station in the t indication field, the specific code point in the t indication field may not be valid for the SRS resource set in which a small number of t values are configured.

Accordingly, the UE may stipulate/assume/promise with the base station not to transmit a specific SRS resource set(s) whose t value is not applied as a valid value (or where the t value is interpreted as N/A) (Option 3).

As an another example, the UE may stipulate/assume/promise with the base station to transmit a specific SRS resource set(s) based on a t value indicated for an SRS resource set(s) other than a specific SRS resource set(s) for which that t value does not apply as a valid value (Option 4).

As an example, in a specific antenna switching configuration where multiple SRS resource sets are configured, option 3 may be utilized when the base station (intentionally) triggers only some SRS resource sets for partial antenna switching or configuration/instruction of antenna switching for a subset of Rx/Tx antennas.

As another example, as shown in Table 8, assume that four t values are configured for SRS resource set #3 and two t values (e.g., t=1, 3) are configured for SRS resource set #4.

Here, interpretation of the t indication field for SRS resource set #4 may be '00: t=1', '01: t=3', '10: N/A', and '11: N/A'. Here, if the t indication field indicates '10', the t value for SRS resource set #4 is not valid, and the t value for SRS resource set #3 may be indicated as 7. The UE may use option 4 to transmit both SRS resource sets #3 and #4 by applying t=7.

As another example, assume that the t value indicated by a specific DCI is not valid for multiple SRS resource sets, but is valid for a specific single SRS resource set. At this time, the UE may transmit all triggered SRS resource sets by applying a valid t value using option 4.

As another example, assume that the t value indicated by a specific DCI is not valid for one or more SRS resource sets, but is valid for one or more other SRS resource sets. At this time, the UE may map each SRS resource set to a valid t value according to predefined rules.

For example, the UE may map the t value configured/indicated for a valid SRS resource set with the lowest set index (according to a predefined rule) to an invalid SRS resource set with the lowest set index.

At this time, when multiple SRS resource sets are transmitted together based on a valid t value, the UE may apply option 4 only when the symbol-level positions (within the slot) of the SRS resources included in the plurality of SRS resource sets do not overlap.

For example, if the symbol-level positions (in slots) of SRS resources included in multiple SRS resource sets overlap, the UE may cancel transmission and drop all SRS resources of the invalid SRS resource set.

As another example, invalid values (e.g., N/A, IV) among the t values configured in each SRS resource set may be defined/configured as described later.

For example, assume that the first/second SRS resource set is configured/connected/mapped to a single SRS trigger state. Here, for the first SRS resource set, t={IV, IV, 2, 3} may be configured by the base station, and for the second SRS resource set, t={2, 3, 4, IV} may be configured by the base station.

Here, the first and second t values (or/and the lowest code point and second lowest code point values of the t indication field) are used for triggering of the second SRS second set only, the third t value (or/and the third lowest codepoint in the t indication field) is used for triggering of both SRS resource sets, and the fourth t value may be used for triggering only the first SRS resource set. The above-described example may also be applied when more than two SRS resource sets are configured/connected to a single SRS trigger state.

The above-described embodiments and options may be utilized/operated independently, but are not limited thereto. The above-described embodiments and options may be utilized/operated in combination with each other.

In the above-described embodiments and options, configuration of the base station may mean higher layer signaling (e.g., RRC signaling). Activation of the base station may mean MAC level signaling including a MAC CE message. The base station's indications may mean dynamic instructions using MAC CE/DCI, etc.

Figure 9:
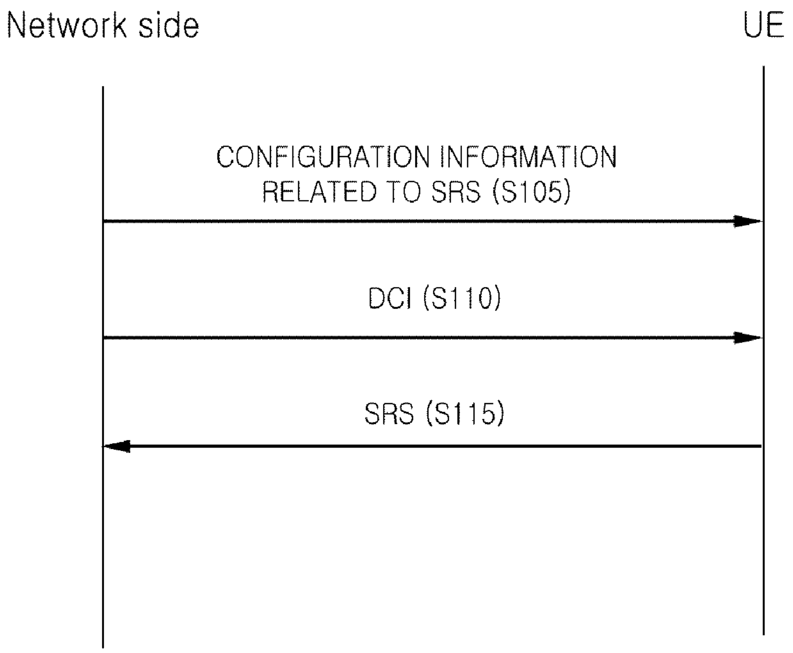
FIG. 9 is a diagram for describing the signaling procedure of the network side and the UE according to an embodiment of the present disclosure.

FIG. 9 is a diagram for describing the signaling procedure of the network side and the UE according to an embodiment of the present disclosure.

FIG. 9 shows an example of signaling between a network side and a terminal (UE) in a network situation (e.g., M-TRP situation, etc.) to which the Embodiments (e.g., Embodiment 1, Embodiment 2, Embodiment 3, or a combination of one or more of their specific Embodiments) of the present disclosure described above may be applied.

Here, the UE/network side is exemplary, and may be replaced with various devices to be described with reference to FIG. 10. FIG. 9 is for convenience of description, and does not limit the scope of the present disclosure. Also, some step(s) shown in FIG. 9 may be omitted depending on circumstances and/or settings. In addition, in the operation of the network side/UE of FIG. 9, the above-described uplink transmission/reception operation and the like may be referred to or used.

In the following description, the network side may be one base station including a plurality of TRPs, or may be one cell including a plurality of TRPs. Alternatively, the network side may include a plurality of remote radio heads (RRHs)/remote radio units (RRUs). As an example, an ideal/non-ideal backhaul may be configured between TRP 1 and TRP 2 included in the network side. In addition, although the following description is based on a plurality of TRPs, such description may be equivalently extended and applied to transmission through a plurality of panels/cells, and may also be extended and applied to transmission through a plurality of RRHs/RRUs.

In addition, although described with reference to "TRP" in the following description, "TRP" may be replaced with and applied to a panel, an antenna array, a cell (e.g., a macro cell/small cell/pico cell, etc.), TP (transmission point), base station (base station, gNB, etc.) as described above. As described above, the TRP may be distinguished according to information (e.g., CORESET index, ID) on the CORESET group (or CORESET pool).

As an example, when one UE is configured to perform transmission and reception with a plurality of TRPs (or cells), this may mean that a plurality of CORESET groups (or CORESET pools) are configured for the one UE. The configuration of such CORESET group (or CORESET pool) may be performed through higher layer signaling (e.g., RRC signaling, etc.).

In addition, the base station may mean a generic term for an object that transmits/receives data to and from the UE. For example, the base station may be a concept including one or more TPs (Transmission Points), one or more TRPs (Transmission and Reception Points), or the like. In addition, the TP and/or TRP may include a panel, a transmission and reception unit, and the like of the base station.

The UE may receive SRS-related configuration information from the network side (S105).

Here, as in Embodiments 1 to 3 described above, SRS-related configuration information may include configuration information related to SRS transmission, configuration information for one or more SRS resource sets (i.e., N (N is a natural number) SRS resource sets), etc. and each SRS resource set may include one or more SRS resources, and accordingly, configuration information may include configuration information for one or more SRS resources.

Additionally, SRS-related configuration information may include usage values for each SRS resource set (or for each SRS resource). Here, uses may include codebook, non-codebook, beam management, antenna switching or/and positioning, etc.

In addition, the information whose usage is set by antenna switching included in the SRS-related configuration information may be configured in the form of a subset of 'xTyR', which was previously reported to the base station as the capability information of the UE.

Additionally, SRS-related configuration information may include time domain operation (i.e., periodic transmission, aperiodic transmission, semi-periodic transmission) information for each SRS resource set (or for each SRS resource).

Additionally, SRS-related configuration information may include information for configuring one or more slot offsets for each SRS resource set. Up to 4 slot offsets may be configured for each SRS resource set, but are not limited to this.

Additionally, the SRS-related configuration information may include information indicating available slots from slot n+k through which the aperiodic SRS resource set is transmitted. Here, slot n refers to a slot in which a DCI triggering aperiodic SRS (i.e., DCI including an SRS request field) is transmitted, and K may refer to a triggering offset.

For example, the operation of the UE (100 or 200 in FIG. 10) in step S105 described above receiving the SRS-related configuration information from the network side (200 or 100 in FIG. 10) can be implemented by the device in FIG. 10, which will be described below. For example, referring to FIG. 10, one or more processors 102 may control one or more transceivers 106 and/or one or more memories 104 to receive the SRS-related configuration information, and one or more transceivers 106 may receive the SRS-related configuration information from a network side.

The UE may transmit DCI from the network side (S110).

At this time, the DCI may include an SRS request field that triggers SRS transmission for one or more SRS resource sets among one or more SRS resource sets configured by configuration information. Additionally or alternatively, the DCI may include a slot offset indicator field (or at (i.e., slot offset) value indication field) indicating a slot offset.

As an example, the number of slot offsets configured for each of one or more SRS resource sets triggered by the SRS request field may be the same, but is not limited thereto.

In addition, one or more SRS resource sets may be configured for each codepoint of the SRS request field. As an example, multiple SRS resource sets may be configured to a specific code point of the SRS request field.

For example, the operation of the UE (100 or 200 in FIG. 10) in step S110 described above receiving the DCI from the network side (200 or 100 in FIG. 10) can be implemented by the device in FIG. 10, which will be described below. For example, referring to FIG. 10, one or more processors 102 may control one or more transceivers 106 and/or one or more memories 104 to receive the control information, and one or more transceivers 106 may receive the control information from a network side.

The UE may transmit the SRS to the network based on the configuration information and DCI (S115).

The UE may transmit (aperiodic) SRS based on a specific slot offset value indicated by DCI. Here, the specific slot offset value may be a slot offset value indicated by DCI among one or more slot offset values set for the SRS resource set triggered by DCI.

For example, the operation of the UE (100 or 200 in FIG. 10) in step S115 described above transmitting an SRS to the network side (200 or 100 in FIG. 10) or receiving an SRS from the network side (200 or 100 in FIG. 10) can be implemented by the device of FIG. 10, which will be described below.

Figure 10:
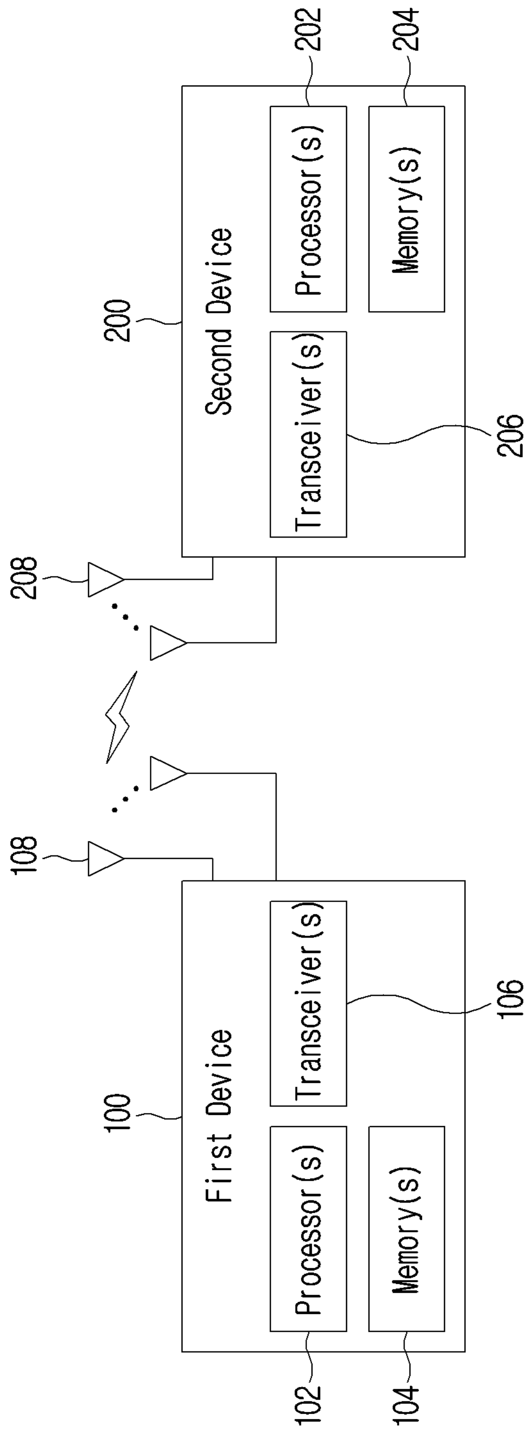
FIG. 10 illustrates a block diagram of a wireless communication device according to an embodiment of the present disclosure.

For example, referring to FIG. 10, one or more processors 102 may control one or more transceivers 106 and/or one or more memories 104 to transmit SRS.

General Device to which the Present Disclosure May be Applied

FIG. 10 illustrates a block diagram of a wireless communication device according to an embodiment of the present disclosure.

In reference to FIG. 10, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

FIG. 12 illustrates a vehicle device according to an embodiment of the present disclosure.

In reference to FIG. 12, a vehicle 100 may include a communication unit 110, a control unit 120, a memory unit 130, an input and output unit 140*a* and a positioning unit 140*b*.

A communication unit 110 may transmit and receive a signal (e.g., data, a control signal, etc.) with external devices of other vehicle, or a base station, etc. A control unit 120 may perform a variety of operations by controlling elements of a vehicle 100. A control unit 120 may control a memory unit 130 and/or a communication unit 110 and may be configured to implement descriptions, functions, procedures, proposals, methods and/or operation flow charts included in the present disclosure. A memory unit 130 may store data/a parameter/a program/a code/a command supporting a variety of functions of a vehicle 100. An input and output unit 140*a* may output an AR/VR object based on information in a memory unit 130. An input and output unit 140*a* may include HUD. A positioning unit 140*b* may obtain position information of a vehicle 100. Position information may include absolute position information, position information in a driving lane, acceleration information, position information with a surrounding vehicle, etc. of a vehicle 100. A positioning unit 140*b* may include a GPS and a variety of sensors.

In an example, a communication unit 110 of a vehicle 100 may receive map information, traffic information, etc. from an external server and store them in a memory unit 130. A positioning unit 140*b* may obtain vehicle position information through a GPS and a variety of sensors and store it in a memory unit 130. A control unit 120 may generate a virtual object based on map information, traffic information and vehicle position information, etc. and an input and output unit 140*a* may indicate a generated virtual object on a window in a vehicle 1410, 1420. In addition, a control unit 120 may determine whether a vehicle 100 normally operates in a driving lane based on vehicle position information. When a vehicle 100 is abnormally out of a driving lane, a control unit 120 may indicate a warning on a window in a vehicle through an input and output unit 140*a*. In addition, a control unit 120 may send a warning message on abnormal driving to surrounding vehicles through a communication unit 110. According to a situation, a control unit 120 may transmit position information of a vehicle and information on a driving/vehicle problem to a relative agency through a communication unit 110.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device XXX, YYY of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device XXX, YYY of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving, by a user equipment (UE) from a base station, configuration information related to sounding reference signal (SRS) transmission;

receiving, by the UE from the base station, downlink control information (DCI); and transmitting, by the UE to the base station, a SRS based on the DCI and the configuration information, wherein the configuration information includes information related to at least one available slot offset for each of at least one triggered SRS resource set among at least one SRS resource set, wherein, based on a maximum number of the at least one available slot offset configured for all of the at least one SRS resource set being greater than 1:

the DCI includes an offset indicator field related to an available slot offset among the at least one available slot offset, and a bit width of the offset indicator field is based on the maximum number of the at least one available slot offset for all of the at least one SRS resource set, and wherein, based on the maximum number of the at least one available slot offset configured for all of the at least one SRS resource set being 1, the DCI does not include the offset indicator field.

2. The method of claim 1, wherein:

the DCI includes an SRS request field related to the at least one triggered SRS resource set among the at least one SRS resource set.

3. The method of claim 2, wherein:

the SRS is transmitted to the base station based on the at least one triggered SRS resource set indicated by the SRS request field.

4. The method of claim 3, wherein:

the SRS is transmitted to the base station based on the available slot offset indicated by the DCI among the at least one available slot offset configured for the at least one triggered SRS resource set.

5. The method of claim 1, wherein:

the number of the at least one available slot offset configured for the at least one triggered SRS resource set is 1 to 4.

6. The method of claim 1, wherein:

the configuration information includes information related to a resource type of the at least one SRS resource set to aperiodic.

7. A user equipment (UE) comprising:

at least one transceiver; and at least one processor coupled to the at least one transceiver;

wherein the at least one processor is configured to:

receive, from a base station through the at least one transceiver, configuration information related to sounding reference signal (SRS) transmission;

receive, from the base station through the at least one transceiver, downlink control information (DCI); and transmit, to the base station through the at least one transceiver, a SRS based on the DCI and the configuration information, wherein the configuration information includes information related to at least one available slot offset for each of at least one triggered SRS resource set among at least one SRS resource set, wherein, based on a maximum number of the at least one available slot offset configured for all of the at least one SRS resource set being greater than 1:

the DCI includes an offset indicator field related to an available slot offset among the at least one available slot offset, and a bit width of the offset indicator field is based on the maximum number of the at least one available slot offset for all of the at least one SRS resource set, and wherein, based on the maximum number of the at least one available slot offset configured for all of the at least one SRS resource set being 1, the DCI does not include the offset indicator field.

8. A base station comprising:

at least one transceiver; and at least one processor coupled to the at least one transceiver;

wherein the at least one processor is configured to:

transmit, to a user equipment (UE) through the at least one transceiver, configuration information related to sounding reference signal (SRS) transmission;

transmit, to the UE through the at least one transceiver, downlink control information (DCI); and receive, from the UE through the at least one transceiver, the SRS based on the DCI and the configuration information, wherein the configuration information includes information related to at least one available slot offset for each of at least one triggered SRS resource set among at least one SRS resource set, wherein, based on a maximum number of the at least one available slot offset configured for all of the at least one SRS resource set being greater than 1:

the DCI includes an offset indicator field related to an available slot offset among the at least one available slot offset, and a bit width of the offset indicator field is based on the maximum number of the at least one available slot offset for all of the at least one SRS resource set, and wherein, based on the maximum number of the at least one available slot offset configured for all of the at least one SRS resource set being 1, the DCI does not include the offset indicator field.

* * * * *